(12) United States Patent
Junqua et al.

(10) Patent No.: US 6,983,244 B2
(45) Date of Patent: Jan. 3, 2006

(54) METHOD AND APPARATUS FOR IMPROVED SPEECH RECOGNITION WITH SUPPLEMENTARY INFORMATION

(75) Inventors: Jean-Claude Junqua, Santa Barbara, CA (US); Roland Kuhn, Santa Barbara, CA (US); Matteo Contolini, Santa Barbara, CA (US); Rathinavelu Chengalvarayan, Santa Barbara, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 60 days.

(21) Appl. No.: 10/652,146

(22) Filed: Aug. 29, 2003

(65) Prior Publication Data

US 2005/0049860 A1    Mar. 3, 2005

(51) Int. Cl.
    *G10L 15/22* (2006.01)
(52) U.S. Cl. .................................... 704/231; 704/270
(58) Field of Classification Search ........ 704/231–245, 704/270–275
    See application file for complete search history.

(56) References Cited

U.S. PATENT DOCUMENTS

| | | | | |
|---|---|---|---|---|
| 5,566,272 A | * | 10/1996 | Brems et al. ............... | 704/231 |
| 5,748,841 A | * | 5/1998 | Morin et al. ................ | 704/257 |
| 5,912,949 A | | 6/1999 | Chan et al. ............... | 379/88.03 |
| 2002/0178344 A1 | * | 11/2002 | Bourguet et al. .............. | 712/1 |

FOREIGN PATENT DOCUMENTS

WO    WO 9921171    4/1999

OTHER PUBLICATIONS

U.S. Appl. No. 10/139,255, Y. Gao, et al., "Methods and Apparatus for Conversational Name Dialing", filed May 3, 2002.
U.S. Appl. No. 10/107,314, S.-C. Chang, et al., "Speech Recognition System", filed Mar. 28, 2002.

* cited by examiner

Primary Examiner—David D. Knepper
(74) Attorney, Agent, or Firm—Harness, Dickey & Pierce, PLC

(57) ABSTRACT

A method for improving recognition results of a speech recognizer uses supplementary information to confirm recognition results. A user inputs speech to a speech recognizer. The speech recognizer resides on a mobile device or on a server at a remote location. The speech recognizer determines a recognition result based on the input speech. A confidence measure is calculated for the recognition result. If the confidence measure is below a threshold, the user is prompted for supplementary data. The supplementary data is determined dynamically based on ambiguities between the input speech and the recognition result, wherein the supplementary data will distinguish the input speech over potential incorrect results. The supplementary data may be a subset of alphanumeric characters that comprise the input speech, or other data associated with a desired result, such as an area code or location. The user may provide the supplementary data verbally, or manually using a keypad, touchpad, touchscreen, or stylus pen.

27 Claims, 4 Drawing Sheets

METHOD AND APPARATUS FOR IMPROVED SPEECH RECOGNITION WITH SUPPLEMENTARY INFORMATION

FIELD OF THE INVENTION

The present invention relates to voice dialing systems, and more particularly to improving the performance of voice dialing systems.

BACKGROUND OF THE INVENTION

Voice dialing systems require speech recognition capabilities to process voice commands. Speech recognition capabilities may be implemented in a mobile phone to allow a user to easily dial a phone number. For example, the user may initiate a call to a contact in an address book on the mobile phone by saying the name of the contact. Speech recognition allows the voice dialing system to process the name and automatically dial the correct number.

In order for the voice dialing system to correctly identify the correct number to dial, the user must say the name of the contact clearly. For example, distortion, mispronunciation, and background noise may cause the voice dialing system to misunderstand the intended contact. Therefore, voice dialing systems may implement a system wherein a confidence value is assigned to the voice input of the user. In other words, the confidence value indicates the presumed accuracy of the intended contact as determined by the voice dialing system. A low confidence value may indicate that further measures are necessary in order to dial the correct number. For example, the voice dialing system may require the user to restate the name of the intended contact. Of course, in a particular implementation, the role of the confidence value might be played by a measure whose value would be low when speech is well-recognized, and high when misunderstanding is probable. This could be called an "uncertainty measure." A high value of the uncertainty measure might indicate that further measures are necessary to dial the correct number. Despite the superficial differences between the two types of measures, they play the same kind of role in the system.

SUMMARY OF THE INVENTION

A method for improving recognition results of a speech recognizer at a remote location comprises receiving input speech from a user at the remote location. One or more candidate matches are determined based on the input speech. In another embodiment, the one or more candidate matches represent the whole list of possible candidates, and such list is sorted according to the input speech. The user is prompted for supplementary data associated with the input speech. The supplementary data is received from the user. One of the one or more candidate matches is selected based on the input speech and the supplementary data.

In another aspect of the invention, a method for improving recognition results of a speech recognizer in an electronic device comprises receiving input speech from a user at the device. The input speech is interpreted at a speech recognizer. One or more candidate entries from a plurality of candidate entries are determined based on the input speech. In another embodiment, the one or more candidate matches represent the whole list of possible candidates, and such list is sorted according to the input speech. A confidence measure is generated for the one or more candidate entries based on the input speech. The user is prompted for supplementary data associated with the input speech if the confidence measure is below a threshold. The supplementary data is received from the user at the device. One of the one or more candidate entries is selected based on the input speech and the supplementary data.

In another aspect of the invention, a system for directing telephone calls based on input speech comprises a speech recognizer that receives input speech from a remote user. A database includes a plurality of entries. A controller communicates with the speech recognizer and the database to select one or more candidate entries from the plurality of entries based on the input speech. The controller determines supplementary data based on ambiguities between the input speech and the one or more candidate entries and prompts the user for the supplementary data.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
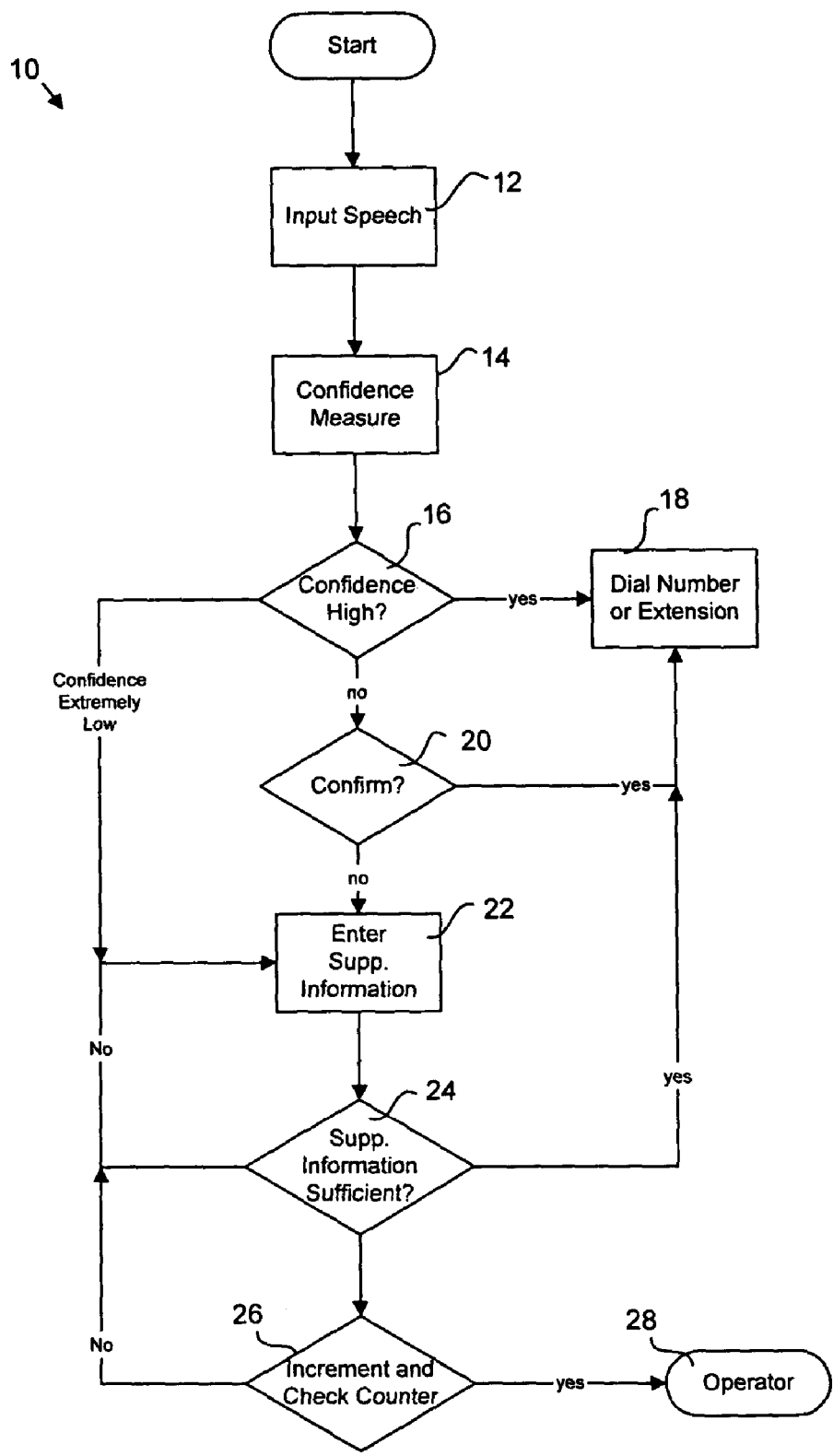
FIG. 1 is a flow diagram of a voice dialing system according to the present invention.

As shown in FIG. 1, a user initiates a voice dialing algorithm 10 by speaking a contact name at step 12. The voice dialing system 10 interprets the input contact name and associates the input contact name with a contact name in an address book. The voice dialing system 10 determines a confidence measure of the input contact name at step 14. The voice dialing system determines if the confidence measure is above a threshold at 16. If the confidence measure is high, the voice dialing system 10 acts on the contact name and dials the phone number of the contact at step 18. For example, the voice dialing system 10 may require that the confidence measure is above a specific threshold, such as 60%. The threshold may be predetermined or be modifiable by the user.

If the confidence measure is below the threshold but not lower than a minimum threshold, the voice dialing system 10 asks the user to confirm that the spoken contact name was interpreted correctly at step 20. For example, the voice dialing system 10 may repeat the contact name and ask the user to reply "yes" or "no." If the user says "yes," then the voice dialing system 10 may proceed with the phone call and dial the number of the confirmed contact name at step 18. If the user says "no," the voice dialing system 10 requires the user to enter supplementary information at step 22. Alternatively, if the confidence measure is below the minimum threshold, the voice dialing system 10 may omit step 20 and move directly to step 22. The system 10 may ask the user to enter the supplementary information using a keypad and/or voice commands. For example, the voice dialing system 10 may require the user to speak the initials of the intended contact, or to enter the initials using the keypad. The user may enter supplementary information using other suitable methods, such as a mouse, touchpad, touchscreen, or stylus pen. In another embodiment, the voice dialing system 10 may require that the user enter keypad information prior to asking for input speech at step 12. In this embodiment, the voice dialing system 10 may interpret the input speech according to constraints defined by the keypad input.

At step 24, the voice dialing system 10 processes the supplementary information to determine the correct contact name, and thereafter proceeds to step 18. If the supplementary information is not sufficient to determine the correct contact name, further actions may be necessary. For example, the voice dialing system 10 may return to step 22 to request additional supplementary information. In another embodiment, the voice dialing system 10 may return to step 12 and require the user to restate the intended contact name. In another embodiment, the voice dialing system 10 may not be able to correctly determine the input speech. In this case, the voice dialing system 10 may direct the user to an operator for further assistance. For example, the voice dialing system 10 may increment and check a counter at step 26 if the supplementary information is not sufficient to determine a contact. If the counter has not reached a predetermined setpoint, the voice dialing system 10 may continue to request supplementary information at step 22. If the counter has reached the setpoint, the voice dialing system 10 may direct the user to an operator at step 28.

The voice dialing system 10 determines what supplementary information to request according to ambiguities of the initial spoken contact name that is input at step 12. For example, if the intended contact name is "John Smith," and there are numerous entries in the address book with the initials "J" and "S," then requesting the user to input initials would be ineffective. In this instance, the voice dialing system 10 may require the user to enter other supplementary information such as the first three letters of the last name of the intended contact. Alternatively, the voice dialing system 10 may require the user enter an area code of the intended contact.

The supplementary information that the voice dialing system 10 requires at step 22 is minimized. In other words, the voice dialing system 10 will request as little information as possible in order to confirm the intended contact name and proceed with the call. The voice dialing system 10 will not request the supplementary information if the initial confidence measure determined at step 14 was sufficient. If the voice dialing system 10 requires keypad inputs, the voice dialing system 10 will request the minimum number of key presses necessary to distinguish the intended contact name from an N-best list of contact names. For example, if the first three letters of both the intended contact and a similar entry are "smi," the voice dialing system 10 may ask the user to input the first four letters of the intended contact. Alternatively, the voice dialing system 10 may simply ask the user to input the contact name using the keypad, and then automatically select the correct contact as the keys are entered. In other words, if the user begins to input supplementary information, the voice dialing system 10 may automatically select the correct contact name as soon as sufficient information has been entered. The voice dialing system 10 may also dynamically request a different type of supplementary information as the user inputs previously requested information.

In another embodiment, the voice dialing system 10 may compensate for garbled or distorted input speech. A speech recognizer may initially interpret the input speech incorrectly. After the user inputs supplementary information, the input speech may be reinterpreted by the speech recognizer. The speech recognizer interprets the input speech within the constraints defined by the supplementary information. In this manner, the voice dialing system 10 may also compensate for mispronunciations.

In another embodiment, the voice dialing system 10 may compensate for misspellings or typographical errors in the user's manual input. For example, the voice dialing system 10 may determine that the supplementary information is not consistent with a contact list or database. The system 10 may thus include an algorithm to determine an approximate matching between the supplementary information and the database or contact list, and eventually considering the input speech.

Figure 2:
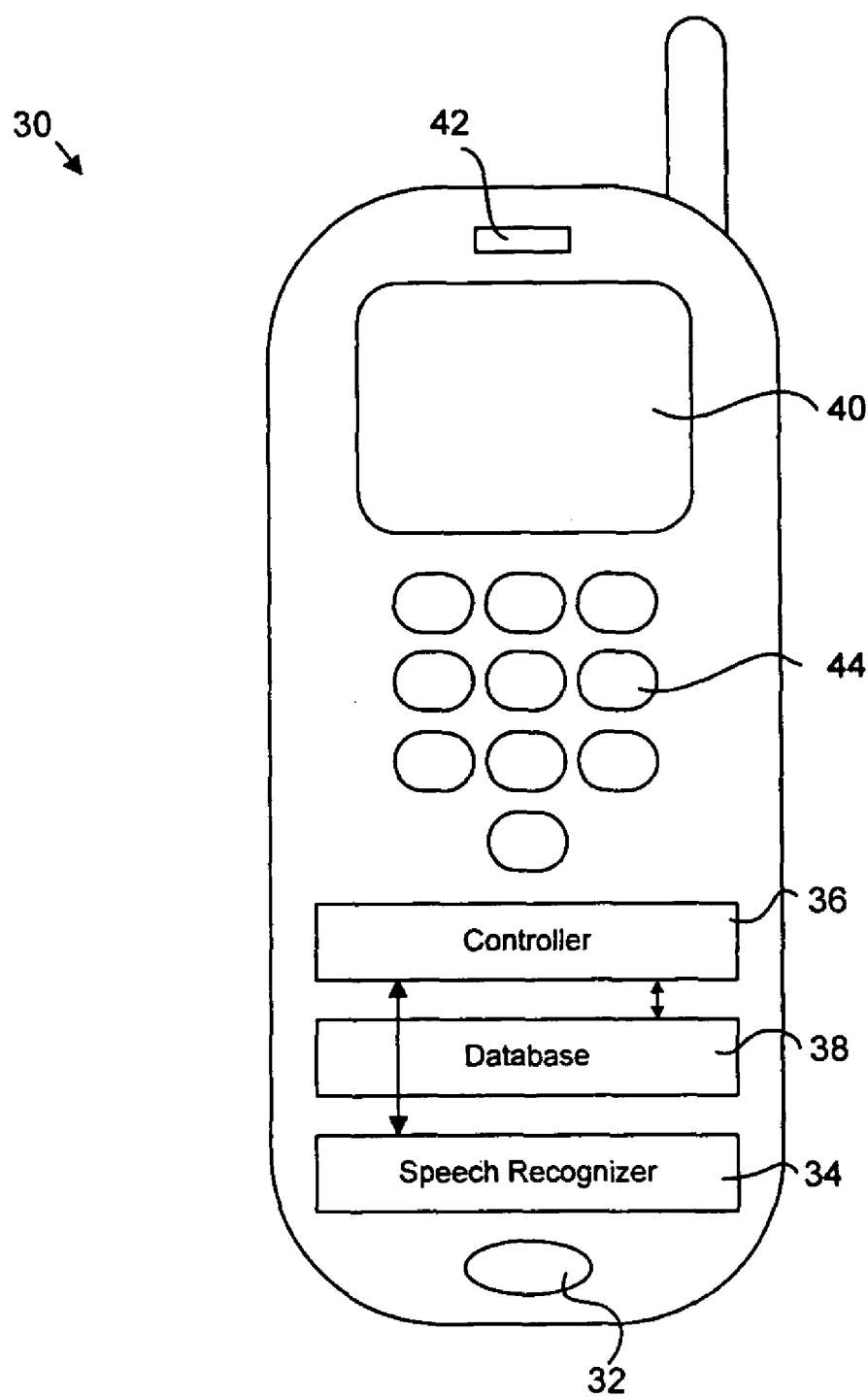
FIG. 2 is a functional block diagram of a mobile device according to the present invention.

A mobile device 30 incorporating the voice dialing system 10 is shown in FIG. 2. The mobile device may be a mobile phone, PDA, or other suitable device. A user speaks a contact name, or other audio input, into an audio input mechanism 32 of the mobile device 30. A speech recognizer 34 interprets the audio input. A controller 36 compares the audio input as interpreted by the recognizer 34 to a database of contact names 38. The controller 36 generates a confidence measure based on the comparison.

If the confidence measure is greater than a threshold, the controller 36 dials the number of the contact. If the confidence measure is not greater than the threshold, the controller 36 requests a "yes" or "no" verification from the user. If the user does not answer "yes," the controller 36 determines what supplementary information to request from the user. In other words, the controller 36 determines desired supplementary information according to potential ambiguities between the intended contact name and the interpreted contact name. Supplementary information includes, but is not limited to, spelling, initials, and area code. The desired supplementary information may be conveyed to the user visually at a display 40 or at an audio output mechanism or speaker 42. The user may enter the supplementary information verbally into the audio input mechanism 32, or manually at a keypad 44. The controller 36 determines the correct contact name based on the supplementary information. Alternatively, the controller 36 may forego the step of requesting a "yes" or "no" verification. For example, if the confidence measure is greater than a second threshold, the controller 36 may determine that a particular contact name is correct and automatically dial the corresponding number.

In addition to contact names, the user may apply the present invention to other applications. In one embodiment, the user may request navigation information. The user inputs a location or place name into the audio input mechanism 32. The speech recognizer 34 interprets the audio input. The controller 36 compares the audio input as interpreted by the recognizer 34 to a list of locations in the database 38. The controller 36 may request supplementary information relevant to navigation. For example, if the user input a city name, the controller 36 may request a state abbreviation if the city name was found in more than one state. In another embodiment, the user may request information about a company by speaking a company name into the audio input mechanism 32. The controller 36 may ask for supplementary information such as a stock abbreviation of the company. In still another embodiment, the user may request email or voicemail from a specific source.

Figure 3:
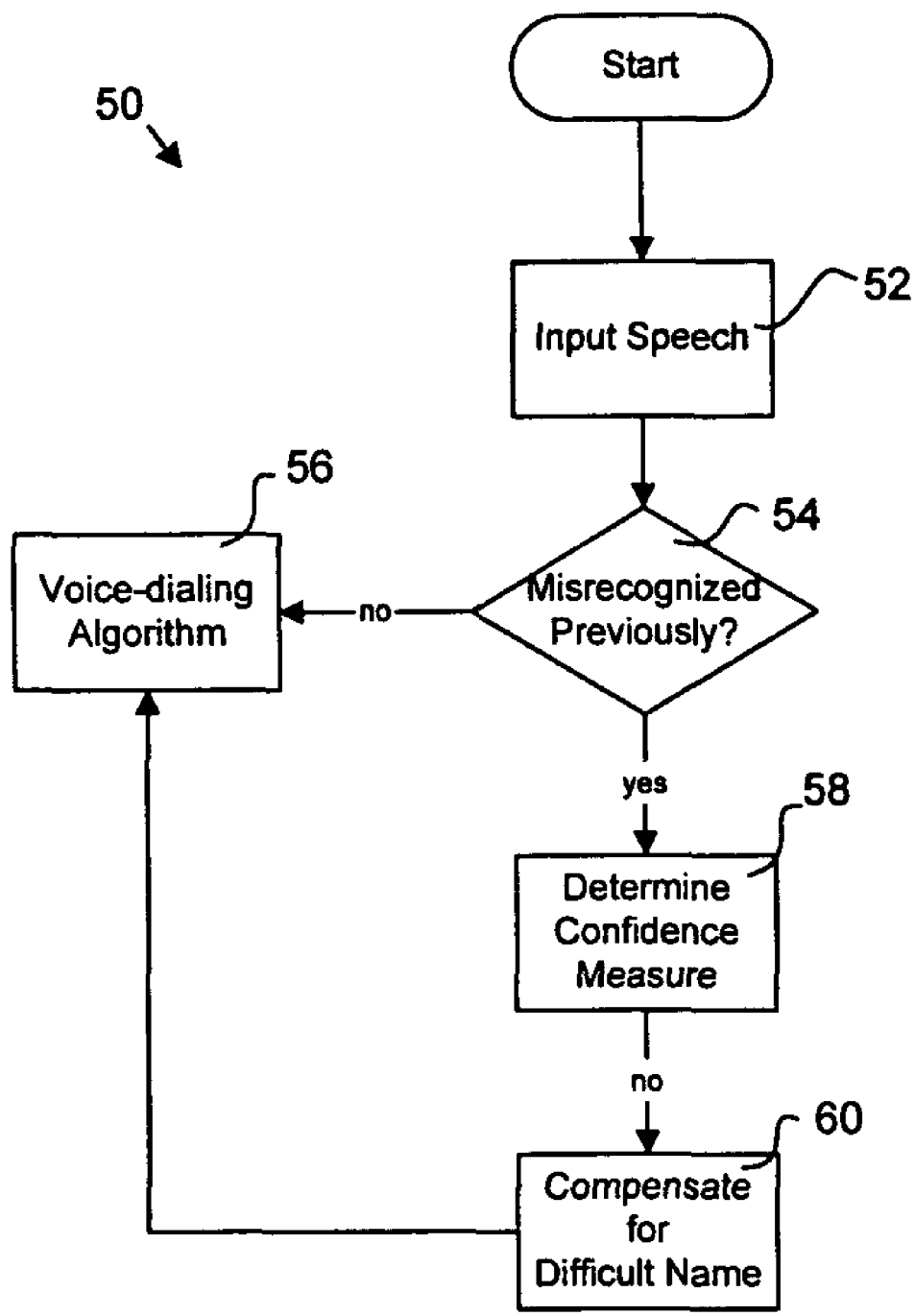
FIG. 3 is a flow diagram of a voice dialing system incorporating a history-based confidence measure according to the present invention.

A history-based voice dialing system 50 may incorporate a history-based confidence measure as shown in FIG. 3. Certain names and other spoken inputs may be misrecognized more often than others. Additionally, speech from certain callers and/or speakers may be more difficult to recognize. For example, the user speaks a contact name at a mobile phone or other device to be interpreted by a speech recognizer at step 52. At step 54, the history-based voice dialing system 50 determines if any contact names on an N-best list have been misrecognized previously. For example, the history-based voice dialing system 50 may include a history module that keeps track of names that have been misrecognized. Alternatively, the history module may include names that are known to be difficult to recognize, such as non-native names or names with unusual pronunciations. In other words, specific names or words may be hard-coded into the system 50 to indicate that they are easily confusable. For example, the names "Ryan" and "Brian" may be automatically recognized as names that are confusable with one another. If the history module does not indicate that any names on the list have been previously misrecognized, or that any of the names are known to be difficult, the history-based voice dialing system 50 may proceed to a voice dialing system at step 56. Otherwise, the history-based voice dialing system continues to step 58.

A confidence estimation module determines the history-based confidence measure based in part on the names tracked by the history module at step 58. The history-based confidence measure is based on names that were misrecognized in past recognition sequences. In other words, if the N-best list includes any difficult or previously misrecognized names, the history-based voice dialing system 50 assumes that the input speech may have been misrecognized. Therefore, the typical confidence measure may not be satisfactory, and the confidence threshold may be adjusted accordingly. In this manner, the history-based voice dialing system 50 ensures that potential misrecognized input speech is confirmed with supplementary information. At step 60, further action is taken to verify the input speech. For example, the presence of a difficult name on the N-best list may automatically require supplementary information.

In another embodiment, the history-based voice dialing system 50 may not require that a confidence measure be determined. In other words, the history-based voice dialing system 50 may omit step 58 and compensate for difficult names using other criteria. For example, the history-based voice dialing system 50 may automatically require supplementary information if a difficult name is on the N-best list, regardless of any confidence measure.

Figure 4:
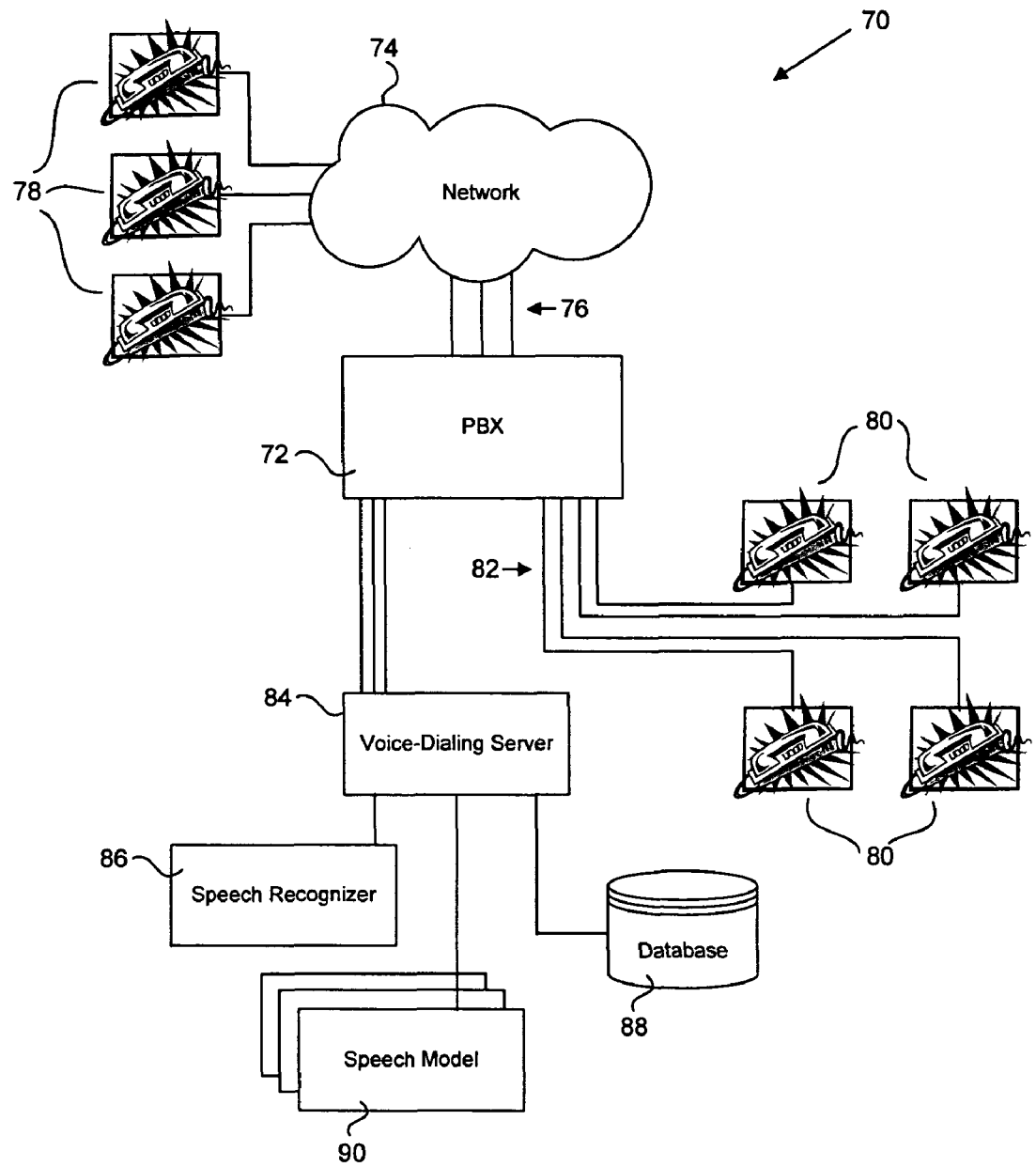
FIG. 4 is functional block diagram of an automated switchboard according to the present invention.

Referring now to FIG. 4, a voice dialing service or directory 70 may incorporate the present invention to facilitate calls made by callers with speech that is difficult to recognize. A user may call an automated switchboard such as a private branch exchange (PBX) switching system 72. A user may access the PBX 72 through a telephone network infrastructure 74. The PBX 72 is connected to the telephone network 74 through one or more outside lines 76. Outside telephone stations 78 are reached through a unique telephone number. Additionally, one or more internal telephone stations 80 may be connected to the PBX 72 through telephone station lines 82. Each individual telephone station 80 may be assigned a unique extension number. A voice dialing server 84 connected to the PBX 72 enables callers to reach an internal station 80 or an outside telephone station 78 by using voice dialing. In other words, callers may call from the outside stations 78 to reach the internal stations 80, callers may call from the internal stations 80 to the outside stations 78, and/or callers at internal stations 80 may call other internal stations 80. In another embodiment, outside callers can contact the PBX 72 or similar switchboard to call other outside callers. An example of a voice dialing server is shown in U.S. patent application Ser. No. 5,930,336, filed Sep. 30, 1996, which is hereby incorporated by reference in its entirety.

A user from an outside station 78 or from an internal station 80 connects to the voice dialing server 84 through the PBX 72. Voice input from the user is received at the voice dialing server 84. For example, the user may request to be connected to a specific contact. The voice dialing server 84 includes a speech recognizer 86. The speech recognizer 86 interprets the input request from the user. The voice dialing server determines an N-best list of candidate contacts from a contact database 88. Each potential contact in the N-best list has a confidence measure. The voice dialing server may request supplementary information from the user through the PBX 72 in order to determine the correct contact. The voice dialing server 84 may include, in addition to a general speaker independent model, a plurality of speech models that are specific to some speaker characteristic such as gender or accent. The speech model may be configured based on speech from such callers. The voice dialing server 84 may modify the confidence measure based on information from the speech model 90. Output from the speech model 90 may be dynamically combined with the supplementary information supplied by the user to more efficiently determine the correct contact. Additionally, the voice dialing server 84 may include multiple speech models for different users. The voice dialing server 84 may dynamically select a speech model for a particular user based on the input speech. Alternatively, the voice dialing server 84 may select a speech model for a particular user based on prior calls from the user. For example, the voice dialing server 84 may include speech models for specific accents or dialects.

As shown in FIG. 4, the voice dialing service 70 may be used to determine a contact from a large list of potential contacts. While a contact list residing on a mobile phone or other device may be limited, a directory or switching system may be responsible for an indefinitely large list of contacts. It is therefore possible for the voice dialing service 70 to determine an extremely large N-best list based on the input speech from the user. The supplementary information of the present invention can be used to quickly narrow down the list of contacts so that the voice dialing system 70 may determine the correct contact. It should be understood that a similar voice dialing system may be used to connect users of various types of telephony devices to intended contacts. For example, a mobile telephone user may connect to a remotely located voice dialing system or server to contact other users using the present invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for improving recognition results of a speech recognizer, comprising:
   receiving input speech from a user;
   determining one or more candidate matches based on the input speech;

generating a prompt to the user for supplementary information by assessing ambiguity that remains after said step of determining one or more candidate matches and tailoring said prompt to induce the user to supply additional information tending to resolve said ambiguity;

receiving the supplementary data from the user as a response to said prompt; and selecting one of the one or more candidate matches based on the input speech and the supplementary data.

2. The method of claim 1 further comprising interpreting the input speech at a speech recognizer.

3. The method of claim 2 wherein the speech recognizer interprets the input speech based in part on the supplementary data.

4. The method of claim 1 further comprising generating a confidence measure for the one or more candidate matches based on the input speech.

5. The method of claim 4 wherein the user is prompted for the supplementary data if the confidence measure is below a threshold.

6. The method of claim 4 further comprising modifying the confidence measure according to a speech model that is indicative of the user.

7. The method of claim 1 wherein the supplementary data is a subset of alphanumeric characters comprising the input speech.

8. The method of claim 1 wherein the supplementary data is at least one of an area code, a location, and initials of a name.

9. The method of claim 1 wherein receiving the supplementary data includes receiving the supplementary data through at least one of verbal input and manual input.

10. The method of claim 9 wherein manual input includes input from at least one of a keypad, a touchpad, a touchscreen, and a stylus pen.

11. The method of claim 1 further comprising prompting the user to confirm the selected candidate match.

12. The method of claim 1 further comprising establishing a communication between the user and an entity associated with the one of the one or more candidate matches.

13. The method of claim 12 wherein establishing the communication includes initiating at least one of a telephone call, an electronic mail message, a voicemail message, and a text message.

14. The method of claim 12 wherein the entity is at least one of a company, a government agency, one or more persons, a location, and a service.

15. The method of claim 1 wherein the supplementary data is related to ambiguities of the input speech.

16. The method of claim 1 wherein determining one or more candidate matches includes determining one or more candidate matches based on a recognition history of the one or more candidate matches, wherein the recognition history indicates if one of the one or more candidate matches is difficult for a speech recognizer to interpret.

17. The method of claim 16 further comprising generating a confidence measure for the one or more candidate matches based on the input speech and the recognition history and prompting the user for the supplementary data if the confidence measure is below a threshold.

18. The method of claim 17 further comprising adjusting at least one of the confidence measure and the threshold based on the recognition history.

19. The method of claim 1 wherein the remote location is a directory assistance service.

20. The method of claim 1 further comprising determining an approximate match between the supplementary data and the one or more candidate matches based on at least one of typographical errors and misspellings in the supplementary data received from the user.

21. The method of claim 1 further comprising determining an approximate match between the input speech and the one or more candidate matches based on at least one of the supplementary data and mispronunciations in the input speech.

22. The method of claim 1 further comprising providing information about an entity associated with the one of the one or more candidate matches to the user.

23. The method of claim 22 wherein the entity is at least one of a company, a government agency, one or more persons, a location, and a service.

24. The method of claim 22 wherein the information includes at least one of navigation information, directory assistance information, company information, and contact information relating to the entity.

25. The method of claim 1 further comprising prompting the user to input information to be transmitted to an entity associated with the one of the one or more candidate matches.

26. The method of claim 25 wherein the entity is at least one of a company, a government agency, one or more persons, a location, and a service.

27. The method of claim 1 wherein the input speech is a subset of the one or more candidate matches.

\* \* \* \* \*